(12) United States Patent
Koerner et al.

(10) Patent No.: US 11,233,294 B2
(45) Date of Patent: Jan. 25, 2022

(54) DUAL-VOLTAGE BATTERY AND ASSEMBLY METHOD FOR SAME

(71) Applicant: HELLA GmbH & Co. KGaA, Lippstadt (DE)

(72) Inventors: Andre Koerner, Lippstadt (DE); Sebastian Kahnt, Karlstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 41 days.

(21) Appl. No.: 16/298,420

(22) Filed: Mar. 11, 2019

(65) Prior Publication Data
US 2019/0207192 A1    Jul. 4, 2019

Related U.S. Application Data

(63) Continuation of application No. PCT/EP2017/072116, filed on Sep. 4, 2017.

(30) Foreign Application Priority Data

Sep. 9, 2016  (DE) ..................... 10 2016 116 972.2

(51) Int. Cl.
*H01M 10/00*    (2006.01)
*H01M 50/502*   (2021.01)
(Continued)

(52) U.S. Cl.
CPC ....... *H01M 50/502* (2021.01); *H01M 10/425* (2013.01); *H01M 10/613* (2015.04);
(Continued)

(58) Field of Classification Search
CPC .. H01M 2/206; H01M 2/1077; H01M 10/425; H01M 10/613; H01M 2010/4271;
(Continued)

(56) References Cited

U.S. PATENT DOCUMENTS

| 5,712,553 A | 1/1998 | Hallberg |
| 2003/0013009 A1* | 1/2003 | Dansui ................ H01M 6/5038 |
| | | 429/120 |

(Continued)

FOREIGN PATENT DOCUMENTS

| DE | 102011077719 A1 | 12/2012 |
| DE | 102013113182 A1 | 5/2015 |

(Continued)

OTHER PUBLICATIONS

International Search Report dated Oct. 12, 2017 in corresponding application PCT/EP2017/072116.

*Primary Examiner* — Nicholas P D'Aniello
(74) *Attorney, Agent, or Firm* — Muncy, Geissler, Olds & Lowe, P.C.

(57) ABSTRACT

A dual-voltage battery for vehicles having a plurality of battery cells, wherein a respective group of battery cells is connected to form battery cell blocks, having a battery electronic system having a plurality of power switch elements, which, in an assembled state of the dual-voltage batteries, are arranged and designed for connecting at least individual battery cell blocks in series and/or in parallel, wherein a first voltage is provided in a first connection arrangement of the battery cell blocks and wherein a second voltage is provided in a second connection arrangement of the battery cell blocks, and having a multi-part housing containing the battery cells and the battery electronic system in the assembled state.

19 Claims, 5 Drawing Sheets

(51) Int. Cl.
*H01M 10/42* (2006.01)
*H01M 10/613* (2014.01)
*H01M 50/20* (2021.01)
*H02J 1/00* (2006.01)
*H02J 1/08* (2006.01)

(52) U.S. Cl.
CPC ............... *H01M 50/20* (2021.01); *H02J 1/00* (2013.01); *H01M 2010/4271* (2013.01); *H01M 2220/20* (2013.01); *H02J 1/082* (2020.01)

(58) Field of Classification Search
CPC ........... H01M 2220/20; H01M 50/502; H01M 50/20; H02J 1/00; H02J 1/082; Y02E 60/10
See application file for complete search history.

(56) References Cited

U.S. PATENT DOCUMENTS

| | | |
|---|---|---|
| 2008/0118828 A1 | 5/2008 | Brennfoerder |
| 2009/0206679 A1 | 8/2009 | King et al. |
| 2010/0221584 A1* | 9/2010 | Reber ................. H01M 10/425 429/7 |
| 2014/0287278 A1 | 9/2014 | Despesse |
| 2015/0069829 A1 | 3/2015 | Dulle et al. |
| 2016/0036029 A1 | 2/2016 | Tononishi |
| 2017/0012324 A1* | 1/2017 | Giordano .......... H01M 10/4257 |

FOREIGN PATENT DOCUMENTS

| | | |
|---|---|---|
| DE | 102014201348 A1 | 7/2015 |
| DE | 102014006772 A1 | 11/2015 |
| DE | 102015214233 A1 | 2/2016 |
| DE | 102015011284 A1 | 3/2016 |

* cited by examiner

DUAL-VOLTAGE BATTERY AND ASSEMBLY METHOD FOR SAME

This nonprovisional application is a continuation of International Application No. PCT/EP2017/072116, which was filed on Sep. 4, 2017, and which claims priority to German Patent Application No. 10 2016 116 972.2, which was filed in Germany on Sep. 9, 2016, and which are both herein incorporated by reference.

BACKGROUND OF THE INVENTION

Field of the Invention

The present invention relates to a dual-voltage battery, in particular for vehicles, comprising a plurality of battery cells, wherein a respective group of battery cells is connected to form battery cell blocks, comprising a battery electronic system having a plurality of power switch elements, which, in an assembled state of the dual-voltage batteries, are arranged and designed for connecting at least individual battery cell blocks in series and/or in parallel, wherein a first voltage is provided in a first connection arrangement of the battery cell blocks and wherein a second voltage is provided in a second connection arrangement of the battery cell blocks, and comprising a multi-part housing containing the battery cells and the battery electronic system in the assembled state.

Further, the invention relates to an assembly method for a dual-voltage battery, comprising a plurality of battery cells, wherein a respective group of battery cells is connected to form battery cell blocks, comprising a battery electronic system having a plurality of power switch elements, which are arranged and designed for connecting at least individual battery cell blocks in series and/or in parallel, wherein a first voltage is provided in a first connection arrangement of the battery cell blocks and the first voltage and a second voltage are provided in a second connection arrangement of the battery cell blocks, and comprising a multi-part housing containing the battery cells and the battery electronic system.

Description of the Background Art

Dual-voltage batteries of the generic type known today on the market provide in particular a functional and spatial integration of the battery electronic system and the battery cells or battery cell blocks. The two voltages of the dual-voltage batteries are provided in this case in particular with respect to two different ground connections. It is the case in this regard that in particular the power switch elements for the optional serial and parallel connection of the battery cells or battery cell blocks are spatially assigned and arranged distributed spatially directly to the battery cells or battery cell blocks. The same applies to the cell monitoring circuit implemented as part of the battery electronic system. Due to the spatial integration, the construction of the known dual-voltage batteries is complicated and their assembly expensive. In particular, a separate preassembly of the battery electronic system, on the one hand, and of the battery cells or battery cell blocks, on the other, and consequently a function test for the battery electronic system or battery cells/battery cell blocks as well before the complete assembly of the dual-voltage battery are not possible. Further, individual components of the dual-voltage battery, for example, in the context of maintenance or repair cannot be replaced or only with considerable effort.

SUMMARY OF THE INVENTION

It is therefore an object of the present invention to provide a modular and structurally simplified dual-voltage battery, which offers advantages in terms of assembly, function testing, and/or maintenance.

To achieve the object, in an exemplary embodiment, the battery electronic system is provided in the form of a battery electronic system unit and in that the battery cell blocks form a battery cell unit that is spatially separate from the battery electronic system unit in such a way that the battery electronic system unit is attached to the battery cell unit in the assembled state of the dual-voltage battery, wherein the battery electronic system unit provides power interfaces which face the battery cell blocks of the battery cell unit in the assembled state, and via which the battery electronic system unit is electrically conductively connected to the battery cell blocks.

A particular advantage of the invention is that the entire battery electronic system is combined into a single unit and further that the battery cell blocks form a second unit, which can be prefabricated or preassembled separately and tested in regard to their functionality before the final assembly. A defect can therefore be detected before the dual-voltage battery is completely assembled. A defective unit/component can therefore be detected early and be replaced or repaired before the final assembly of the dual-voltage battery. Moreover, the production logistics are simplified, because the battery electronic system unit can be preassembled spatially separately from the battery cell unit. The automation of the assembly is simplified in this regard. In addition, it is possible to replace a defective battery electronic system unit or a defective battery cell unit with relatively little effort during maintenance. For example, replacement of the battery cell unit as a whole or of the individual battery cell blocks can take place at an early stage. The power interfaces in this case can be formed, for example, in the form of plug contacts and permit a tool-free connection of the battery cell unit to the electronic system unit or a tool-free disassembly of the units.

In the first connection arrangement, the first voltage is provided from the dual-voltage battery of the invention by a battery cell block or by a parallel connection of battery cell blocks. The second voltage is provided by a series connection of a predetermined number of battery cell blocks. Optionally, further series connections can be connected in parallel here. For example, the first voltage and the second voltage are provided at two different external connections of the dual-voltage battery with respect to a common ground connection. Whereas in the first connection arrangement the first voltage alone is provided at a first external connection, in the second connection arrangement of the battery cell blocks either the first voltage and the second voltage can be provided at the two external connections at the same time or the second voltage alone at a second external connection. The connection of the battery cell blocks therefore occurs purely serially (in series) or purely in parallel or at the same time serially and in parallel.

Further power interfaces (external connections for the first voltage and the second voltage, ground connection), which serve to connect the dual-voltage battery to an external electrical consumer, are provided as a further part of the battery electronic system unit. In particular, the dual-voltage battery can be connected via the further power interfaces to an electrical system of a vehicle and supply a plurality of electrical consumers. Optionally, the power interfaces for the battery cell blocks and the further power interfaces can be provided on opposite sides of the battery electronic system unit. A good accessibility of the further power interfaces is then ensured in the assembled state of the dual-voltage battery as well. In this case, the power interfaces for the battery cell blocks can be realized on the inside and disposed protected in the housing. In addition, an incorrect assembly or malfunction of the dual-voltage battery is prevented.

The battery electronic system unit provides a common circuit carrier for all power switch elements and for the power interfaces, which are designed to connect the battery electronic system unit to the battery cell blocks of the battery cell unit. Optionally, the further power interfaces can furthermore be formed on the circuit carrier. Advantageously, the assembly of the dual-voltage battery is simplified by the provision of a single common circuit carrier for the entire battery electronic system. A distributed arrangement of the battery electronic system on a plurality of circuit carriers and the associated increased logistical and assembly-related effort can be avoided with this advantageous realization of the invention.

A cell monitoring circuit, which is designed to perform a function test or a function check for the battery cell blocks in the first connection arrangement or in the second connection arrangement, is provided as part of the battery electronic system unit. The cell monitoring circuit can preferably be arranged on the common circuit carrier of the battery electronic system unit. It is therefore realized spatially separated from the battery cell unit with the result that the modularity of the dual-voltage battery with respect to the battery electronic system, on the one hand, and the battery cells, on the other, is also maintained in the realization of the cell monitoring circuit.

A cooling module is provided between the battery electronic system unit and the battery cell unit in the assembled state of the dual-voltage battery. The cooling module is preferably used equally for cooling the battery electronic system unit and the battery cell unit. The cooling can take place actively, for example, via fans or fluidically. Alternatively, passive cooling can be provided via a heat sink with heat-emitting surfaces. Optionally, cooling fins are provided in the passive cooling to further improve the cooling effect.

The multi-part housing of the dual-voltage battery provides a top housing part, which is designed to receive the battery electronic system unit. The battery electronic system unit can therefore be preassembled and then inserted into the top housing part. The battery electronic system unit can optionally be fixed in the top housing part via separately formed fastening components, for example, a frame component associated with the multi-part housing. Optionally, the battery electronic system unit can be locked or screwed into the top housing part.

The battery electronic system unit can be formed potted at least in sections. For example, the potting can be realized in the area of the power switch elements or the cell monitoring circuit. It is preferably provided that at least the power interfaces for connection to the battery cell blocks and optionally the further power interfaces are brought out of the potting compound. Advantageously, the potting compound provides mechanical protection for the battery electronic system. In this case, it is possible in particular to carry out the potting for the battery electronic system unit overall, after the battery electronic system unit has been completely preassembled. Potting of individual components of the battery electronic system can therefore be avoided. For example, the battery electronic system unit can be potted after the battery electronic system unit is inserted into the housing of the dual-voltage battery, and preferably into the top housing part.

The multi-part housing provides a bottom housing part, which covers the battery cell unit in the assembled state on a side opposite the battery electronic system unit. Thus, the battery cell unit can be very advantageously attached to the bottom housing part or inserted into the bottom housing part, if the bottom housing part is recessed in the area to which the battery electronic system unit is attached. In particular, in the course of the final assembly of the dual-voltage battery, the battery cell unit can first be attached to the bottom housing part and then the battery electronic system unit can be attached to the battery cell unit. Optionally, it can be provided that the battery electronic system unit is already inserted into the top housing part of the multi-part housing.

A circumferential wall of the multi-part housing, said wall which laterally surrounds the battery cell unit in the assembled state of the dual-voltage battery, can be formed as part of the top housing part or as part of the bottom housing part and in each case can provide a connection geometry for connecting the housing parts. Alternatively, the wall can be realized as a separately made part of the multi-part housing.

Furthermore, in a preassembly step, on the one hand, a battery electronic system unit, comprising the power switch elements, and, on the other, a plurality of battery cell blocks, having a group of battery cells, or a battery cell unit, having the battery cell blocks, are prefabricated and in that then in a final assembly step the battery electronic system unit is attached to the battery cell blocks or the battery cell unit, wherein power interfaces provided on the battery electronic system unit are electrically conductively connected to the battery cell blocks.

An advantage of the invention is also that the assembly of the dual-voltage battery is significantly simplified and a separate replaceability with respect to the components is created due to the spatial separation of the battery electronic system from the battery cell blocks or the battery cell unit. In this respect, the repair of the dual-voltage battery is also improved.

A further improvement of the assembly results in that the battery electronic system unit is inserted into a top housing part of the multi-part housing. For example, the battery electronic system unit can be fixed in the top housing part. The fixing is optionally carried out by various means known to skilled artisan; for example, fasteners are provided such as screws for fixing the battery electronic system unit in the top housing part. For example, the battery electronic system unit is locked in the top housing part. For example, separate attachment components are formed in the housing for fixing the battery electronic system unit in the top housing part.

The battery electronic system unit can be potted at least in the area of the power switch elements. Preferably, the potting takes place after the battery electronic system unit is inserted into the top housing part. The battery electronic system unit can then also be fixed in the top housing part via the potting. For example, to this end, undercuts can be formed between the potting compound and the housing.

An electronic function test for the battery electronic system unit or a cell function test for the battery cell unit and/or the battery cell blocks can be carried out after the preassembly of the battery electronic system unit and before the final assembly of the dual-voltage battery or after the preassembly of the battery cell blocks/battery cell unit and before the final assembly of the dual-voltage battery. Defects in the battery electronic system unit and/or the battery cell blocks and/or the battery cell unit can thus be determined prior to the final assembly of the dual-voltage battery. A replacement of the defective component(s) is therefore possible in a simple manner and with little effort.

Further advantages, features, and details of the invention can be gathered from the further dependent claims and the following description. Features mentioned there can be essential to the invention individually or also in any combination. Features and details described according to the invention of the dual-voltage battery naturally also apply in connection with the assembly method of the invention and vice versa. Thus, the disclosure of the individual aspects of the invention can always be referred to as reciprocal.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

In the drawings.

DETAILED DESCRIPTION

Figure 1:
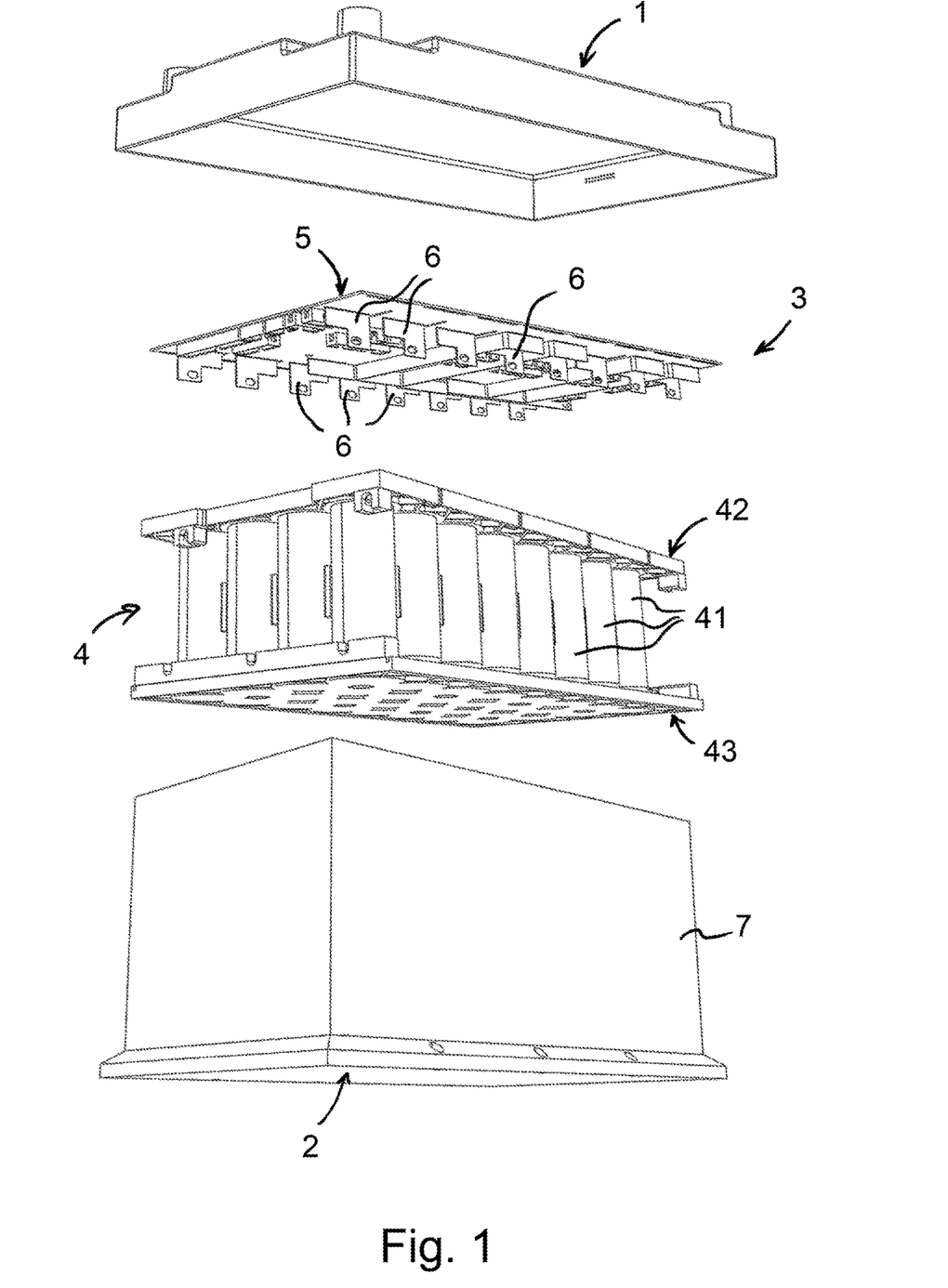
FIG. 1 shows an exploded illustration of an embodiment of a dual-voltage battery of the invention with a multi-part housing, a battery electronic system unit, and a battery cell unit.
Figure 2:
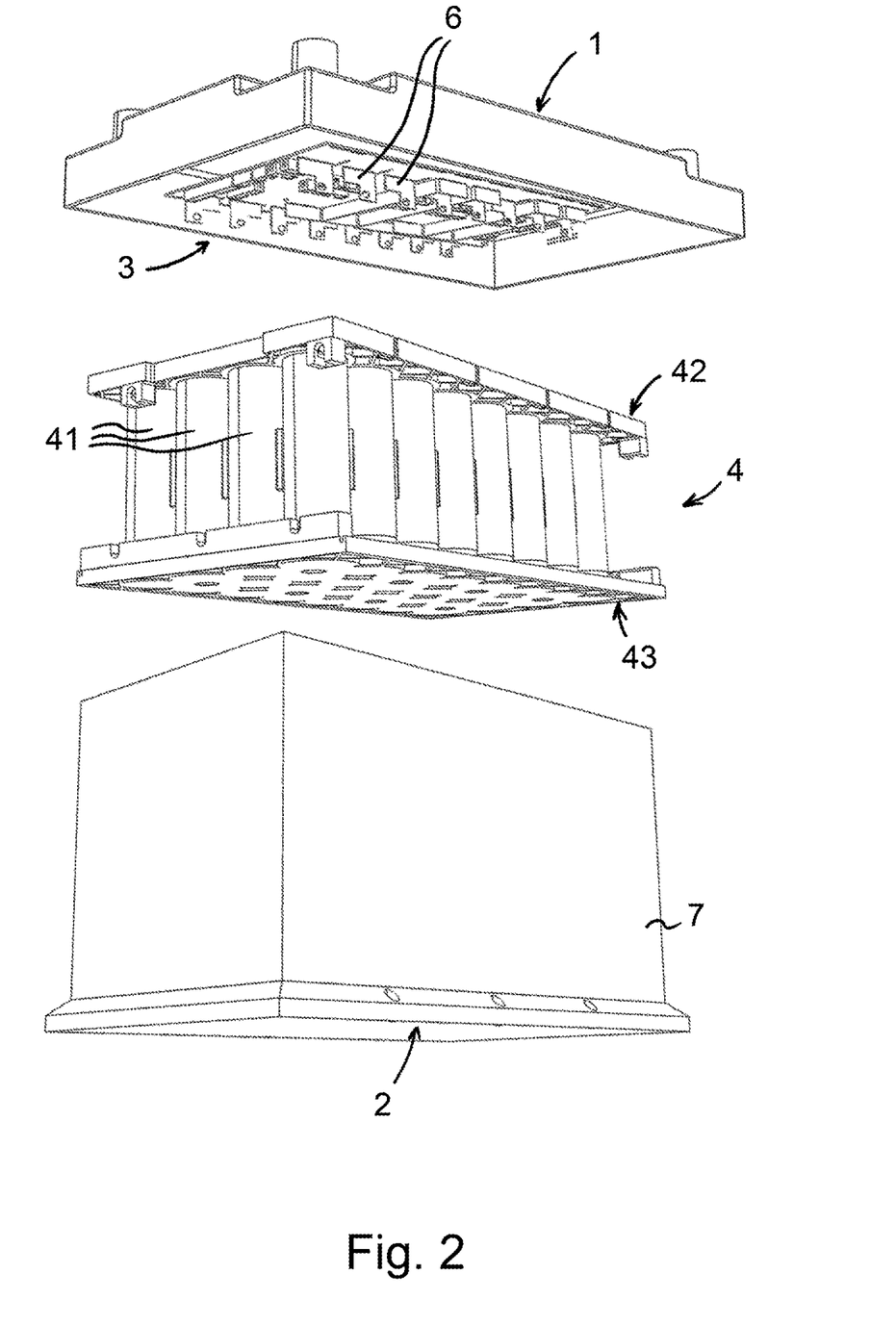
FIG. 2 shows the dual-voltage battery according to FIG. 1, wherein the battery electronic system unit is arranged in a top housing part of the multi-part housing.
Figure 3:
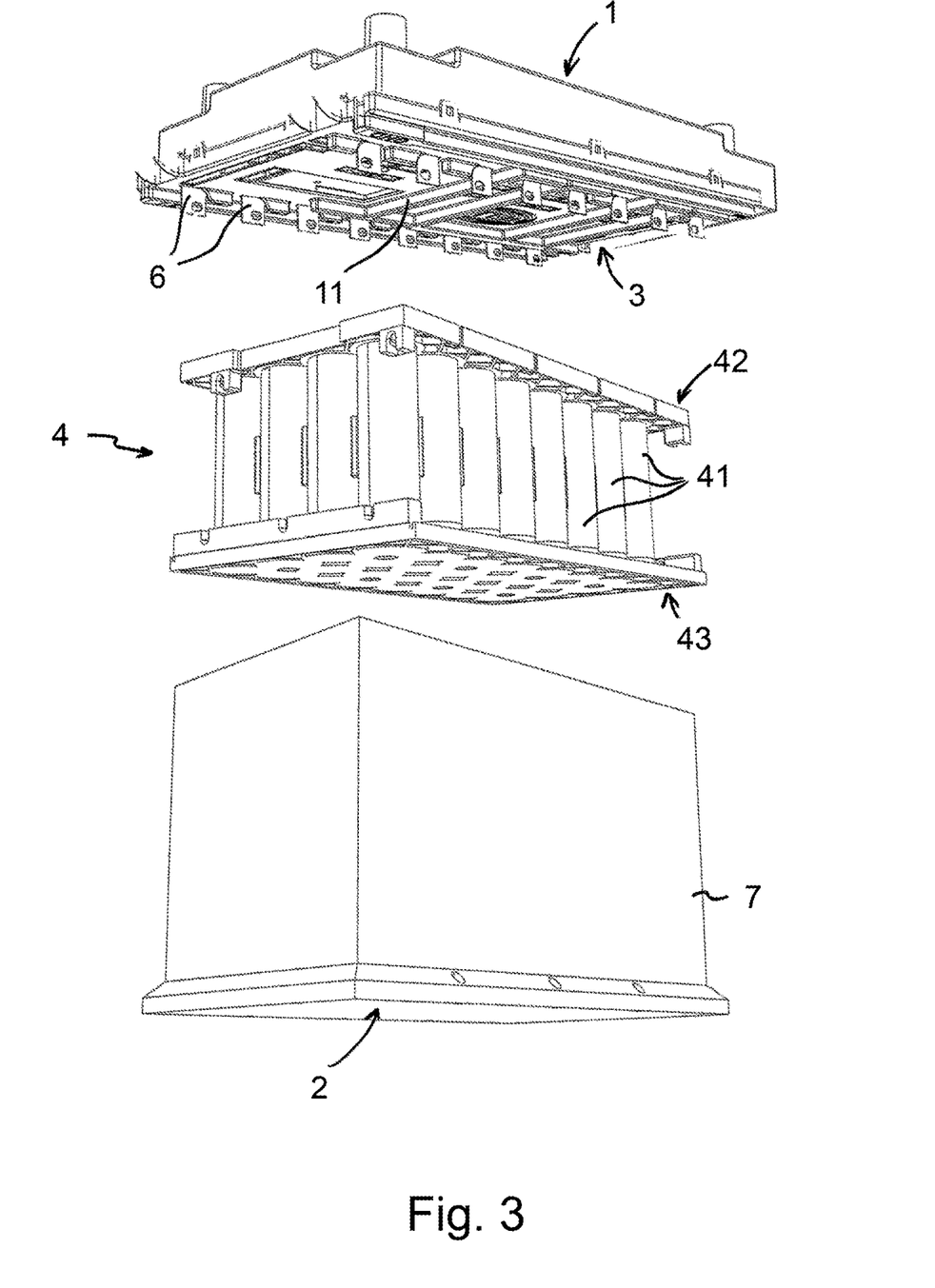
FIG. 3 shows the dual-voltage battery according to FIG. 2, wherein the battery electronic system unit is fixed in the top housing part via a fastening component of the multi-part housing.

A dual-voltage battery of the invention according to an embodiment according to FIGS. 1 to 3 comprises a multi-part housing with a top housing part 1 and a bottom housing part 2 and a battery electronic system designed as a structural unit 3 and a plurality of battery cells 41 combined to form a structural unit 4. In each case, a group of battery cells 41 is connected to form battery cell blocks. The battery cell blocks are not shown separately in the figures. For example, four battery cells 41 form a battery cell block. Battery electronic system unit 3 comprises a single common circuit carrier 5 for all electronic components.

Power switch elements, with which the battery cell blocks can be connected or wired optionally serially (in series) and in parallel, are provided on common circuit carrier 5 of battery electronic system unit 3. In this case, a first voltage is provided in a first connection arrangement of the battery cell blocks and the first voltage and a second voltage in a second connection arrangement of the battery cell blocks. The voltages are supplied at external connections of the dual-voltage battery with respect to a common ground connection.

Further, a plurality of power interfaces 6 for connecting battery electronic system unit 3 to the battery cell blocks of battery cell unit 4 are provided on circuit carrier 5. All power interfaces 6 are provided on a side of battery electronic system unit 3, said side facing battery cell unit 4, in such a way that, in the assembled state, battery electronic system unit 3 is electrically conductively connected to the battery cell blocks of battery cell unit 4 via power interfaces 6. Power interfaces 6 are assigned for this purpose to electrical contacts arranged correspondingly on battery cell unit 4.

Furthermore, a cell monitoring circuit as well as further power interfaces (external connections, ground connection) are provided on circuit carrier 5 of battery electronic system unit 3. The cell monitoring circuit is designed to perform a function check for the battery cell blocks in the first connection arrangement and/or in the second connection arrangement. The further power interfaces are preferably arranged on a side of battery electronic system unit 3, said side being opposite power interfaces 6 for the battery cell blocks. They serve to connect the dual-voltage battery to an external electrical consumer. In particular, the dual-voltage battery can be connected via the further power interfaces to a vehicle electrical system and supply a plurality of electrical consumers.

Battery cell unit 4 provides a total of 32 battery cells 41 arranged routinely in the form of an 8×4 matrix, wherein battery cells 41 are connected, for example, to form eight battery cell blocks with four battery cells 41 each. Further, two carriers 42, 43 are provided, which are assigned to battery cells 41 or to the battery cell blocks at opposite end faces. Battery cells 41 or battery cell blocks are held via carriers 42, 43 and combined to form battery cell unit 4.

According to the invention, battery electronic system unit 3 and battery cell unit 4 are produced as separate units. Battery electronic system unit 3 can therefore be prefabricated or preassembled spatially and functionally independently of battery cell unit 4. In the course of the final assembly, which is shown in particular in two intermediate steps in FIGS. 2 and 3, battery electronic system unit 3 is inserted into top housing part 1 of the multi-part housing of the dual-voltage battery and there fixed via a fastening component 11, formed as a support structure (frame component of the housing). Optionally, it can be provided that battery electronic system unit 3 is provided with a potting compound, which protects the electronic components from dirt and damage, in top housing part 1 at least in sections and preferably in the area of the power switch elements and the cell circuit monitoring.

After fixing of battery electronic system unit 3 in top housing part 1, battery cell unit 4 is inserted into bottom housing part 2. A circumferential wall 7 is provided, which surrounds battery cell unit 4 laterally, on bottom housing part 2, which covers battery cell unit 4 on a bottom side opposite battery electronic system unit 3 in the assembled state. Wall 7 provides a connection geometry for top housing part 1 in the region of a free edge facing top housing part 1 in the assembled state. For example, top housing part 1 is locked with wall 7.

Figure 4:
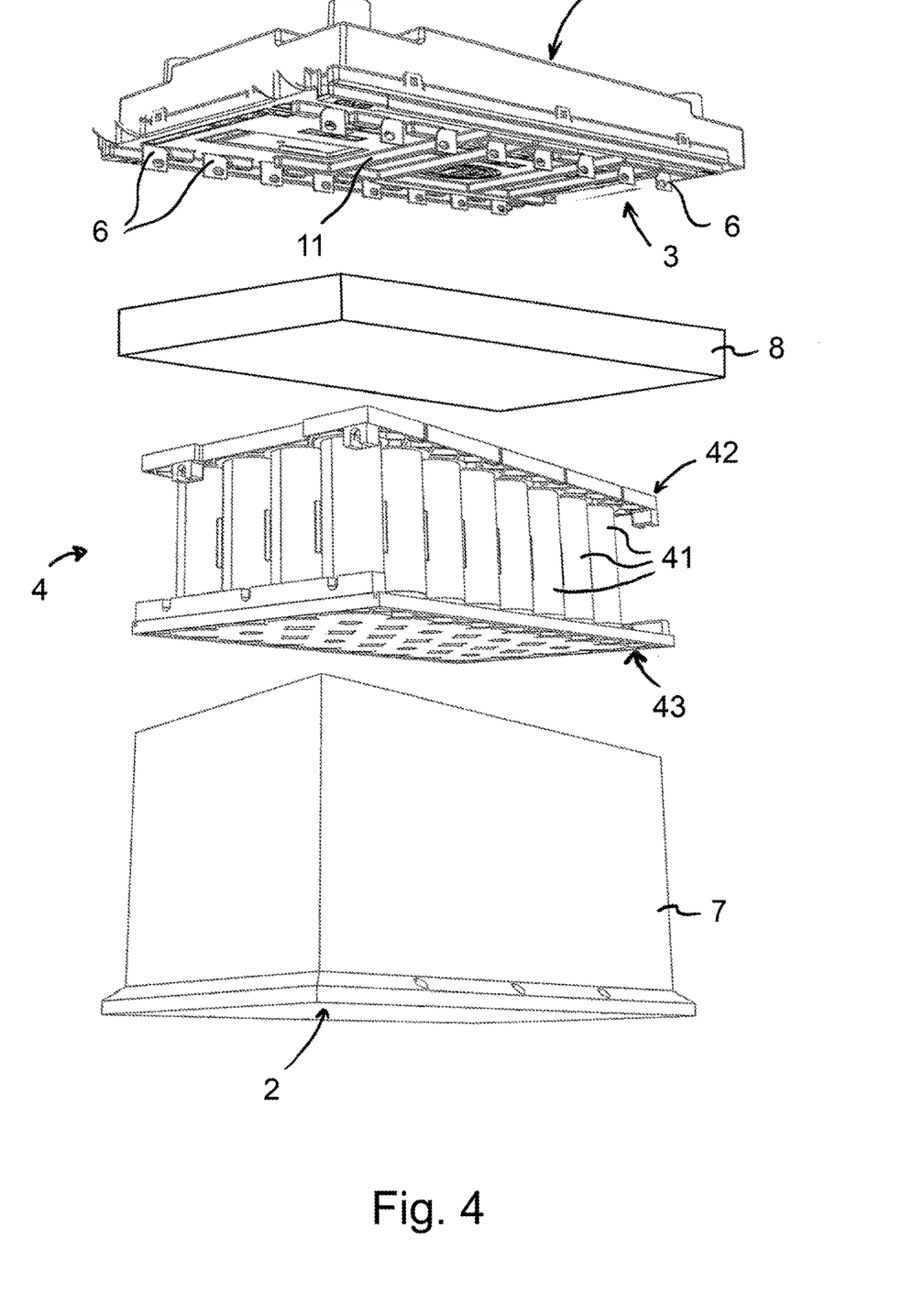
FIG. 4 shows an embodiment of the invention, which provides an additional cooling module.

According to a second embodiment of the invention according to FIG. 4, the dual-voltage battery additionally provides a cooling module 8. Cooling module 8 is used to cool battery electronic system unit 3 and battery cell unit 4. Cooling module 8 is provided spatially between battery electronic system unit 3 and battery cell unit 4. It is surrounded by the multi-part housing of the dual-voltage battery.

Cooling module 8, which is shown schematically in FIG. 4, can be designed for the active cooling of battery electronic system unit 3 and battery cell unit 4. For example, a fan or a cooling fluid circuit can be provided for this purpose. Likewise, cooling module 8 can be used for the passive cooling of said structural components 3, 4. Therefore, it can be designed, for example, as a heat sink or have such a heat sink.

Figure 5:
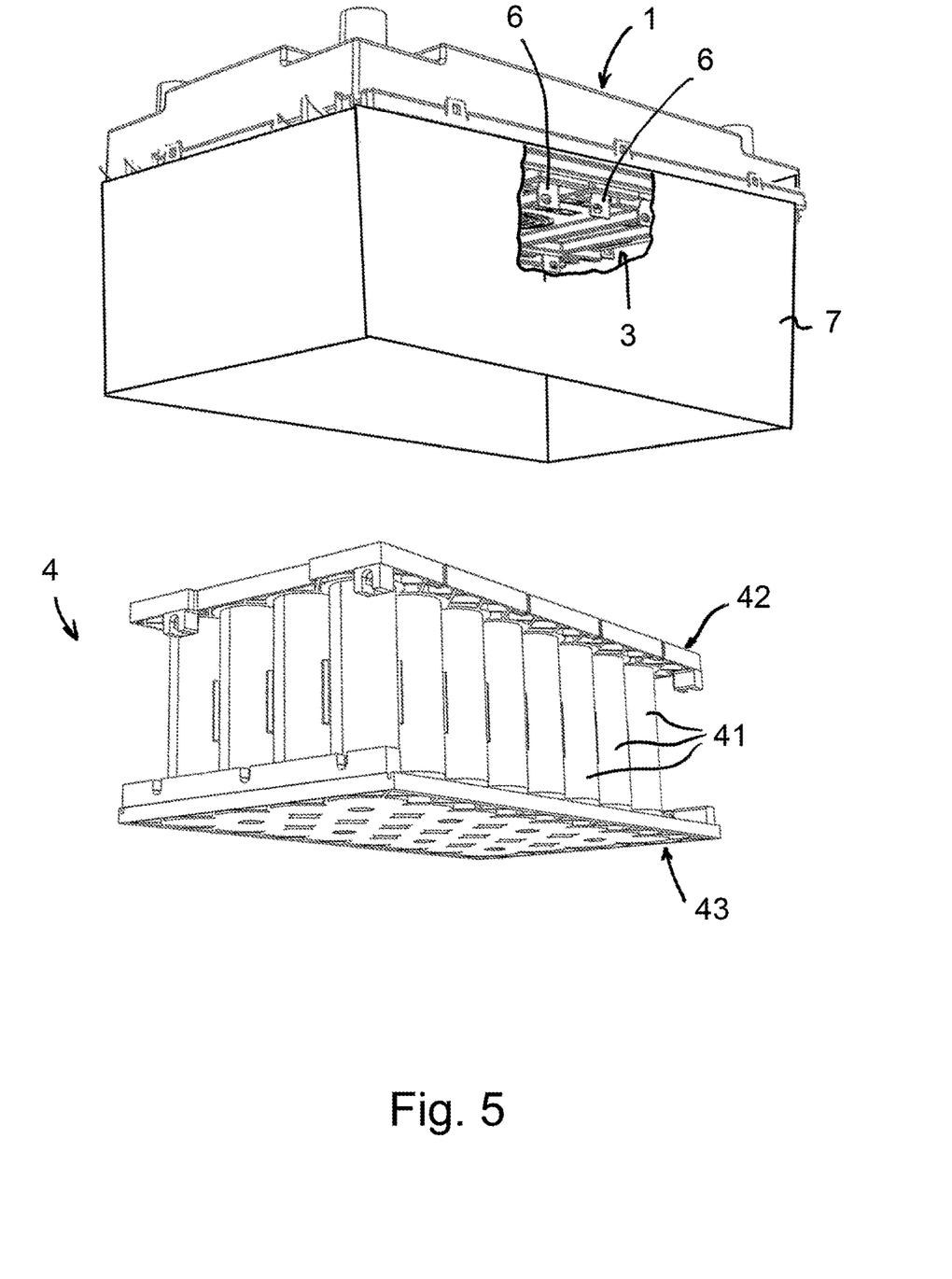
FIG. 5 shows an embodiment of the invention with a modified top housing part.

According to a third embodiment of the invention according to FIG. 5, battery cell unit 4 is provided in the assembled state with a laterally surrounding wall 7 on top housing part 1. Wall 7 in the region of the free edge, which in the present case faces bottom housing part 2, has a connection geometry. Wall 7 is attached to bottom housing part 2 with the free edge.

The examples of the dual-voltage battery shown in the figures describe the invention by way of example only. The skilled artisan will find further embodiments of the dual-voltage battery of the invention while maintaining the essence of the invention, namely the realization of the battery electronic system in a first common unit and the connection of the battery cells to form a common battery cell unit.

For example, fasteners such as screws or clips can be provided for fixing battery cell unit 3 in top housing part 1, or battery electronic system unit 3 is locked in top housing part 1 or fixed solely in top housing part 1 by potting.

For example, it can be provided that in the course of the final assembly, the prefabricated battery electronic system unit 3 is attached to battery cell unit 4 and only then is top housing part 1 mounted. A fixing of the battery electronic system unit, which precedes the connection of battery electronic system unit 3 to battery cell unit 4, in top housing part 1 is therefore not mandatory.

For example, it can be provided that the battery cell blocks produced during preassembly are directly connected to battery electronic system unit 3. At least individual carriers 42, 43 can therefore be omitted.

For example, wall 7 can be made divided. Wall 7 can be formed as a divided wall, for example, partially on top housing part 1 and partially on bottom housing part 2. Likewise, wall 7 can be realized as a separate part of the multi-part housing. Wall 7 then preferably has a connection geometry for connecting wall 7 to top housing part 1 and a further connection geometry for connecting wall 7 to bottom housing part 2.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A dual-voltage battery for vehicles, the dual-voltage battery comprising:
    at least two battery cells, wherein a respective group of battery cells is connected to form battery cell blocks;
    a battery electronic system having a plurality of power switch elements, which, in an assembled state of the dual-voltage battery, are arranged and designed for connecting at least individual battery cell blocks in series and/or in parallel, wherein a first voltage is provided in a first connection arrangement of the battery cell blocks, and wherein a second voltage is provided in a second connection arrangement of the battery cell blocks; and
    a multi-part housing containing the battery cells and the battery electronic system in the assembled state,
    wherein the battery electronic system is provided in the form of a battery electronic system unit,
    wherein opposite end faces of the battery cell blocks are held by an upper battery cell carrier and a lower battery cell carrier to form a battery cell unit that is separate from the battery electronic system unit such that the battery electronic system unit is attached to the battery cell unit in the assembled state,
    wherein the battery electronic system unit provides power interfaces that face the battery cell blocks of the battery cell unit in the assembled state and via which the battery electronic system unit is electrically conductively connected to the battery cell blocks,
    wherein all connections to the battery cell blocks of the battery cell unit occur through a common circuit carrier of the battery electronic system unit, and
    wherein the power interfaces are provided on the common circuit carrier, such that the common circuit carrier is directly electrically connected to each of the battery cell blocks.

2. The dual-voltage battery according to claim 1, wherein the battery electronic system unit provides, in addition to the power interfaces for the battery cell blocks, further power interfaces which are adapted to connect the dual-voltage battery to an external electrical consumer and/or a vehicle electrical system.

3. The dual-voltage battery according to claim 2, wherein the power interfaces for the battery cell blocks and the further power interfaces are provided on opposite sides of the battery electronic system unit.

4. The dual-voltage battery according to claim 2, wherein the power switch elements and the power interfaces for the battery cell blocks or the further power interfaces are provided on the common circuit carrier.

5. The dual-voltage battery according to claim 1, wherein a cell monitoring circuit, which is designed to carry out a functional check for the battery cell blocks in the first connection arrangement and/or in the second connection arrangement, is provided as part of the battery electronic system unit.

6. The dual-voltage battery according to claim 1, wherein a cooling module, which is designed for the active or passive cooling of the battery electronic system unit and the battery cell unit, is arranged between the battery electronic system unit and the battery cell unit in the assembled state.

7. The dual-voltage battery according to claim 5, wherein the battery electronic system unit is formed potted at least in sections and at least in the area of the power switch elements and/or the cell monitoring circuit.

8. The dual-voltage battery according to claim 7, wherein the battery electronic system unit is formed potted such that only the power interfaces for connection to the battery cell blocks and/or other power interfaces extend out of a potting compound.

9. The dual-voltage battery according to claim 1, wherein the multi-part housing includes a top housing part, in which in the assembled state, the battery electronic system unit is provided, wherein a fastening component is provided for fixing the battery electronic system unit in the top housing part, and wherein the multi-part housing includes a bottom housing part, in which in the assembled state, the battery cell unit is provided.

10. The dual-voltage battery according to claim 9, wherein the battery cell unit in the assembled state is surrounded laterally by a circumferential wall and wherein the wall protrudes from the bottom housing part in a direction of the top housing part.

11. The dual-voltage battery according to claim 1, wherein, in the second connection arrangement of the battery cell blocks, the first voltage is also provided in addition to the second voltage.

12. The dual-voltage battery according to claim 1, wherein the first voltage is provided at a first external connection of the dual-voltage battery and wherein the second voltage is provided at a second external connection of the dual-voltage battery.

13. The dual-voltage battery according to claim 1, wherein the first voltage and the second voltage are provided in relation to a ground connection which is the same for the first voltage and the second voltage.

14. An assembly method for the dual-voltage battery of claim 1, the method comprising:
providing the at least two battery cells;
connecting the respective group of battery cells to form the battery cell blocks;
connecting the battery electronic system, having the plurality of power switch elements, to at least individual battery cell blocks in series and/or in parallel, wherein the first voltage is provided in the first connection arrangement of the battery cell blocks and the first voltage and the second voltage are provided in the second connection arrangement of the battery cell blocks;
providing the multi-part housing containing the battery cells and the battery electronic system;
prefabricating, in a preassembly step, the battery electronic system unit comprising the power switch elements, and the battery cell unit that contains the upper battery cell carrier, the lower battery cell carrier and a plurality of the battery cell blocks each containing the group of the battery cells, wherein the opposite end faces of the battery cell blocks are held by the upper battery cell carrier and the lower battery cell carrier;
attaching, in a subsequent assembly step, the battery electronic system unit to the battery cell unit, wherein the power interfaces provided on the battery electronic system unit are electrically conductively connected to the battery cell blocks,
wherein all connections to the battery cell blocks of the battery cell unit occur through the common circuit carrier of the battery electronic system unit, and
wherein the power interfaces are provided on the common circuit carrier, such that the common circuit carrier is directly electrically connected to each of the battery cell blocks.

15. The assembly method according to claim 14, wherein the battery electronic system unit is inserted into a top housing part of the multi-part housing, wherein the battery electronic system unit is fixed in the top housing part, and wherein the battery electronic system unit is connected to the battery cell blocks and/or the battery cell unit.

16. The assembly method according to claim 14, wherein the battery electronic system unit with the power switch elements is potted at least partially.

17. The assembly method according to claim 14, wherein the plurality of battery cell blocks and/or the battery cell unit are attached to a bottom housing part of the multi-part housing before connection to the battery electronic system unit, wherein the bottom housing part covers the battery cell unit at least at a bottom side opposite the battery electronic system unit in the assembled state.

18. The assembly method according to claim 14, wherein an electronic function test for the battery electronic system unit and/or a cell function test for the battery cell unit are performed after the preassembly step and before the subsequent assembly step.

19. The assembly method according to claim 14, wherein in the second connection arrangement of the battery cell blocks, the first voltage and the second voltage are provided with reference to a ground connection which is substantially the same for the first voltage and the second voltage.

* * * * *